(12) United States Patent
Brown et al.

(10) Patent No.: US 7,957,994 B2
(45) Date of Patent: Jun. 7, 2011

(54) DEFINING SERVICE FUNDING FOR A SERVICE ORIENTED ARCHITECTURE

(75) Inventors: William A. Brown, Raleigh, NC (US); Kerrie L. Holley, Montara, CA (US); Garrison A. Moore, Uxbridge (CA); William J. Tegan, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 12/024,772

(22) Filed: Feb. 1, 2008

(65) Prior Publication Data
US 2009/0198535 A1    Aug. 6, 2009

(51) Int. Cl.
G06Q 10/00 (2006.01)
G06F 9/44 (2006.01)
(52) U.S. Cl. .............................................. 705/7; 705/1
(58) Field of Classification Search .................... 705/7
See application file for complete search history.

(56) References Cited

U.S. PATENT DOCUMENTS

| | | | |
|---|---|---|---|
| 5,745,878 A | 4/1998 | Hashimoto et al. | |
| 6,363,393 B1 | 3/2002 | Ribitzky | |
| 6,601,233 B1 | 7/2003 | Underwood | |
| 7,580,946 B2 | 8/2009 | Mansour et al. | |
| 7,720,198 B2* | 5/2010 | Schliermann | 378/95 |
| 2002/0194053 A1 | 12/2002 | Barrett et al. | |
| 2004/0193703 A1* | 9/2004 | Loewy et al. | 709/220 |
| 2005/0154700 A1* | 7/2005 | Lele | 707/1 |
| 2005/0203784 A1 | 9/2005 | Rackham | |
| 2005/0204048 A1* | 9/2005 | Pujol et al. | 709/229 |
| 2005/0222931 A1* | 10/2005 | Mamou et al. | 705/35 |
| 2005/0223109 A1* | 10/2005 | Mamou et al. | 709/232 |
| 2005/0232046 A1* | 10/2005 | Mamou et al. | 365/220 |
| 2006/0235733 A1* | 10/2006 | Marks | 705/7 |
| 2007/0043724 A1* | 2/2007 | Senan et al. | 707/8 |
| 2007/0074148 A1* | 3/2007 | Morgan | 717/101 |
| 2007/0143474 A1 | 6/2007 | Sheng et al. | |
| 2007/0209059 A1 | 9/2007 | Moore et al. | |
| 2007/0244904 A1* | 10/2007 | Durski | 707/10 |
| 2007/0265868 A1* | 11/2007 | Rapp et al. | 705/1 |
| 2008/0028329 A1 | 1/2008 | Eri | |
| 2008/0046259 A1* | 2/2008 | Johnston | 705/1 |
| 2008/0059378 A1* | 3/2008 | D'Alo et al. | 705/59 |
| 2008/0065466 A1* | 3/2008 | Liu et al. | 705/10 |
| 2008/0069082 A1* | 3/2008 | Patrick | 370/351 |
| 2008/0069124 A1* | 3/2008 | Patrick | 370/401 |

(Continued)

OTHER PUBLICATIONS

"SOA Governance: Framework and Best Practices", an Oracle White Paper, May 2007.*

(Continued)

*Primary Examiner* — Ella Colbert
*Assistant Examiner* — Mohammad Z Shaikh
(74) *Attorney, Agent, or Firm* — Brandon C. Kennedy; John R. Pivnichny; Biggers & Ohanian, LLP

(57) ABSTRACT

Methods and systems for defining service funding for a Service Oriented Architecture ('SOA') are described that include, in response to an event requiring a change in service funding, identifying a potential SOA funding model for a business's SOA, the potential SOA funding model governing funding of services implemented in the business's SOA; reviewing for approval the potential SOA funding model by relevant stakeholders of the business; and upon approval of the potential SOA funding model by relevant stakeholders of the business, implementing the approved SOA funding model.

16 Claims, 4 Drawing Sheets

U.S. PATENT DOCUMENTS

| | | | |
|---|---|---|---|
| 2008/0082569 | A1 | 4/2008 | Mansour et al. |
| 2008/0126147 | A1 | 5/2008 | Ang et al. |
| 2008/0127047 | A1 | 5/2008 | Zhang et al. |
| 2008/0172269 | A1* | 7/2008 | Senan et al. ............... 705/7 |
| 2008/0270153 | A1* | 10/2008 | Drapkin et al. .............. 705/1 |
| 2008/0300933 | A1* | 12/2008 | Britton et al. ............... 705/7 |
| 2009/0043622 | A1* | 2/2009 | Finlayson et al. ........... 705/7 |
| 2009/0063171 | A1* | 3/2009 | Isom ........................... 705/1 |
| 2009/0064087 | A1 | 3/2009 | Isom |
| 2009/0182565 | A1* | 7/2009 | Erickson et al. ............ 705/1 |
| 2009/0192867 | A1* | 7/2009 | Farooq et al. ............... 705/10 |
| 2009/0198537 | A1 | 8/2009 | Brown et al. |

OTHER PUBLICATIONS

"SOA Practitioner's Guide: Part I Why Services-Oriented Architecture?", Sep. 15, 2006.*
"TIBCO Software: TIBCO empowers customers with new model for accelerating business process management success; TIBCO BPM Execution Model provides programmatic approach to planning and implementing BPM", M2 Presswire. Coventry: Apr. 10, 2007. p. 1.*
"SOA Governance: Framework and Best Practices", An Oracle White Paper, May 2007, pp. 1-22.*
"SOA Practitioners' Guide Part I Why Services-Oriented Architecture?", Sep. 15, 2006, pp. 1-18.*
"Mercury Unveils BTO Strategy for Service Oriented Architecture", Canada Newswire. Ottawa: Oct. 9, 2006. p. 1.*
"Research and Markets: Cost Reduction is the Key Long-Term Driver of SOA Adoption", M2 Presswire. Coventry: Feb. 15, 2007. p. 1.*
Cherbakov, et al.; Impact of Service Orientation at the Business Level; IBM Systems Journal; Dec. 1, 2005; pp. 1-14; IBM SJ 44-4.
Ferguson, et al.; Service-Oriented Architecture: Programming Model and Product Architecture; IBM Systems Journal; Oct. 21, 2005; pp. 1-24; IBM SJ 44-4.
Freeland; The New CRM Imperative; pp. 3-9; Chapter 1.
Veryard; The Component-Based Business: Plug and Play; Practitioner Series; 2000; Springer; UK.
"SOA Governance: Framework and Best Practices", an Oracle White Paper, May 2007.
"SOA Practitioner's Guide: Part I Why Services-Oriented Architecture?", Sep. 15, 2006.
Executing SOA: A Practical Guide for the Service-Oriented Architect (Bieberstein et al, May 5, 2008).
Office Action, U.S. Appl. No. 12/024,772, mailed Jan. 22, 2010.
Final Office Action, U.S. Appl. No. 12/024,772, mailed Jun. 10, 2010.
Office Action, U.S. Appl. No. 12/233,156, mailed Nov. 15, 2010.
Burns, et al.; The Essentials of an SOA COE; Oct. 27, 2004; pp. 1-16; IBM Global Services.
Establishing SOA CoE & Governance or Need to Validate The Asset Name and The Engagement Model (scope) as Defined Asset; 2004; IBM Corporation.
Establish SOA Center of Excellence & SOA Governance; 2004; IBM Corporation.
IBM Assessments for Service Oriented Architecture part 2; 2004; IBM Corporation.
Kerrie Holley; IBM Assessments for Service Oriented Architecture; 2004; IBM Corporation.
IBM Assessment for AllAmerica Service Oriented Architecture; 2004; IBM Corpopration.
AVIS Futures SOA Assessment IBM Assessments for Service Oriented Architecture; 2004; IBM Corporation.
U.S. Appl. No. 12/024,746, Feb. 2008, Brown, et al.
U.S. Appl. No. 12/024,772, Feb. 2008, Brown, et al.
U.S. Appl. No. 12/025,328, Feb. 2008, Brown, et al.
U.S. Appl. No. 12/025,340, Feb. 2008, Brown, et al.
U.S. Appl. No. 12/233,156, Sep. 2008, Brown, et al.
U.S. Appl. No. 12/327,029, Dec. 2008, Brown, et al.
U.S. Appl. No. 12/326,412, Dec. 2008, Brown, et al.
U.S. Appl. No. 12/326,390, Dec. 2008, Brown, et al.
U.S. Appl. No. 12/326,354, Dec. 2008, Brown, et al.
Establishing SOA CoE & Governance or Need to Validate The Asset Name and The Engagement Model (scope) as Defined Asset; 2004; IBM Corporation.
IBM Strategy and Planning for Services Oriented Architecture; 2004; IBM Corporation.
IBM Assessments for Service Oriented Architecture; 2004; IBM Corporation.
Cherbakov, et al.; Impact of Service Orientation at the Business Level; IBM Systems Journal; Dec. 1, 2005; pp. 1-14; IBM SJ 44-4.
Ferguson, et al.; Service-Oriented Architecture: Programming Model and Product Architecture; IBM Systems Journal; Oct. 21, 2005; pp. 1-24; IBM SJ 44-4.
Freeland; The New CRM Imperative; pp. 3-9; Chapter 1.
Veryard; The Component-Based Business: Plug and Play; Practitioner Series; 2000; Springer; UK.
Office Action dated Apr. 1, 2009 in U.S. Appl. No. 12/024,772.

* cited by examiner

DEFINING SERVICE FUNDING FOR A SERVICE ORIENTED ARCHITECTURE

BACKGROUND OF THE INVENTION

1. Field of the Invention

The field of the invention is data processing, or, more specifically, methods and systems for defining service funding for a Service Oriented Architecture ('SOA').

2. Description Of Related Art

Service Oriented Architecture ('SOA') is an architectural style that guides all aspects of creating and using business processes, packaged as services, throughout their lifecycle, as well as defining and provisioning the IT ('information technology') infrastructure that allows different applications to exchange data and participate in business processes loosely coupled from the operating systems and programming languages underlying those applications. SOA represents a model in which functionality is decomposed into distinct units (services), which can be distributed over a network and can be combined together and reused to create business applications. These services communicate with each other by passing data from one service to another, or by coordinating an activity between two or more services. The concepts of Service Oriented Architecture are often seen as built upon, and the evolution of, the older concepts of distributed computing and modular programming. Although services and a business's SOA architecture are often strictly defined, governance of an SOA, implementation of an SOA, operation of an SOA, and management of an SOA is often not defined. A defined model of governance, however, may increase effectiveness and efficiency in implementing, operating, and managing a business's SOA, thereby providing savings to the business.

SUMMARY OF THE INVENTION

Methods and systems for defining service funding for a Service Oriented Architecture ('SOA') are described that include, in response to an event requiring a change in service funding, identifying a potential SOA funding model for a business's SOA, the potential SOA funding model governing funding of services implemented in the business's SOA; reviewing for approval the potential SOA funding model by relevant stakeholders of the business; and upon approval of the potential SOA funding model by relevant stakeholders of the business, implementing the approved SOA funding model.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
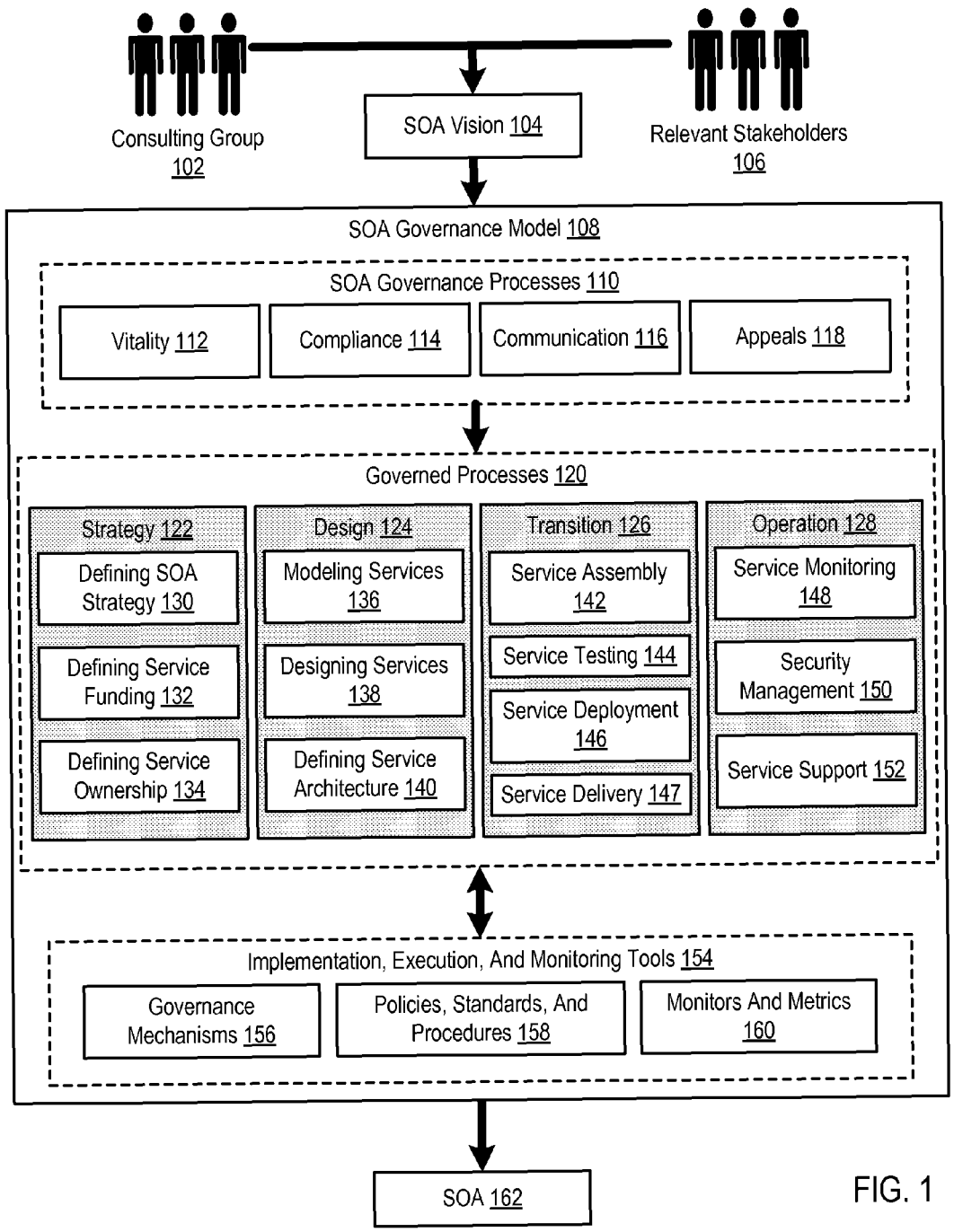
FIG. 1 sets forth a block diagram of a system for defining service funding for an SOA according to embodiments of the present invention.

Exemplary methods and systems for defining service funding for an SOA are described with reference to the accompanying drawings, beginning with FIG. 1. FIG. 1 sets forth a block diagram of a system for governing a Service Oriented Architecture ('SOA') that includes a process of defining service funding for an SOA according to embodiments of the present invention. SOA is an architectural style that guides all aspects of creating and using business processes, packaged as services, throughout their lifecycle, as well as defining and provisioning the information technology ('IT') infrastructure that allows different applications to exchange data and participate in business processes loosely coupled from the operating systems and programming languages underlying those applications. SOA represents a model in which functionality is decomposed into distinct units, called services, which can be distributed over a network, can be combined together, and reused to create business applications. These services communicate with each other by passing data from one service to another, or by coordinating an activity between two or more services. The concepts of Service Oriented Architecture are often seen as built upon, and the evolution of, the older concepts of distributed computing and modular programming.

The system of FIG. 1 includes an SOA governance model (108) that provides parameters used in governing a business's SOA, that is, a governed SOA (162). An SOA governance model may be established through use of a consulting group (102), using software tools and business artifacts, and relevant stakeholders (106) of a business. A consulting group may include one or more individuals that guide members of a business in establishing and implementing an SOA governance model. Such individuals typically are not members of the business. Consulting groups often work closely with relevant stakeholders of the business in establishing and implementing an SOA governance model.

A relevant stakeholder (106) of a business is an individual or party that affects, or can be affected by, a business's actions. "Relevant stakeholders," as the term is used in the specification, refers to stakeholders which are most directly affected by a business's actions with respect to SOA and often have decision making authority with regard to one or more aspects of the SOA governance model. Although only consulting groups and relevant stakeholders are described here with respect to implementing and operating a governance model in accordance with embodiments of the present invention, readers of skill in the art will immediately recognize that many other individuals or group of individuals associated with a business may take part in implementing and operating some or more aspects such a governance model and each such individual or group of individuals and their actions are also well within the scope of the present invention.

The exemplary SOA governance model (108) of FIG. 1 may be implemented and operated according to an SOA vision (104) that may be defined by the consulting (102) and the relevant stakeholders (106) of the business. That is, a consulting group may be used to guide relevant stakeholders through a process of identifying an SOA vision which may be used to define not only primary boundaries of the business's SOA, but also a governance model for the SOA. An SOA vision (104) is a general and broad definition of an SOA strategy to be accomplished through use of an SOA. An example of such an SOA strategy which may be accomplished through use of an SOA, is to reduce redundancy in the use of different software applications that provide similar functionality to different organizational entities of the business. Consider, for example, that a retail sales department and an online sales department use different software applications to provide the similar function of receiving and processing customer orders. An SOA vision may outline business goals of the SOA that may be implemented that reduce such redundancy by providing a single service of customer order receipt and processing to both the retail sales department and the online sales department of the business.

As mentioned above, an SOA governance model (108) provides parameters used in governing a business's governed SOA (162). The exemplary SOA governance model (108) of FIG. 1, for example, includes several SOA governance processes (110). An SOA governance process (110) is a processes that when executed governs one or more governed SOA processes (110), the governed processes typically used in implementing, operating, maintaining, and managing an SOA for a business. That is, the governance processes, when executed, effect governance of the typical implementation, operation, maintenance, and management of an SOA for a business.

The exemplary SOA governance model (108) of FIG. 1 the SOA includes a vitality (112) governance processes, a compliance (114) governance process, a communication (116) governance processes, and an appeals (118) governance process. The vitality (112) governance process maintains the applicability of the SOA governance model. The vitality process ensures that the governance model is current, reflecting current business and information technology and strategy, and also refines other governance processes and governance mechanisms to ensure continued usage and relevance of the governance model.

The compliance (114) governance process governs the review and approval processes used in implementing and managing services within an SOA. The governance processes includes providing criteria defined in the establishment of an SOA governance model to guide such review and approval processes. Such criteria may include a business's principles, standards, defined business roles, and responsibilities associated with those defined business roles.

The communication (116) governance process governs communication of SOA vision, SOA plans, and the SOA governance model to members of the business for educating such members. The communication governance process ensures that governance is acknowledged and understood throughout a business and also provides, to members of the business, environments and tools for easy access and use of information describing an SOA governance model.

The appeals (118) governance process enables members of a business to appeal SOA decisions. This appeals governance process therefore also provides exceptions to business policies, information technology policies, and other criteria that must typically be met within SOA decision-making processes.

As mentioned above, each of the governance processes when executed governs one or more governed processes. A governed process is a processes used in implementing, operating, maintaining, and managing an SOA for a business. The exemplary SOA governance model (108) of FIG. 1 includes categories of governed processes (122, 124, 126, 128). Each category represents an area of SOA implementation, operation, maintenance, and management carried out by the governed processes included in the category.

The categories of governed processes in the example of FIG. 1 include strategy (122), design (124), transition (126), and operation (128). Processes included in the category of strategy (122) generally carry out an initial planning of service implementation. Examples of governed processes included in the category of strategy include a process for defining SOA strategy (130), defining service funding (132), and defining service ownership (134). Processes included in the category of design (124) generally carry out identification and definition of particular services for an SOA. Examples of governed processes included in the category of design include a process for modeling services (136), designing services (138), and defining service architecture (140). Processes included in the category of transition (126) generally carry out implementation of services in an SOA. Examples of governed processes included in the category of transition (126) include a process for service assembly (142), service testing (144), service deployment (146), and service delivery (147). Processes included in the category of operation (128) generally carry out management and monitoring of services operating within an SOA. Examples of governed processes included in the category of operation (128) include a process for service monitoring (148), security management (150), and service support (152).

The SOA governance processes (110) of FIG. 1 are executed and implemented by one or more implementation, execution and monitoring tools (154). Such implementation tools may include governance mechanisms (156). Governance mechanisms (156) may include one or more individuals, organizational entities, and business infrastructure to carry out governance according to the governance model (108). Such individuals may include relevant stakeholders, committees, or boards responsible for carrying out such governance. Organizational entities may include, for example, a board of directors, management groups, departments within a business, and the like. Business infrastructure may include available human labor, software applications, database management systems, computer technology, funding, and other types of business infrastructure as will occur to those of skill in the art. Different governance mechanisms (156) may be responsible for carrying out governance of different categories (122,124,126,128) of governed processes (120).

Other exemplary implementation and execution tools (154) in the exemplary system of FIG. 1 include policies, standards, and procedures (158). Policies, standards, and procedures (158) are embodiments of a business's overall business principles and are typically used in guiding decision-making in many of the governed processes (120). That is, policies, standards, and procedures (158) are compliance requirements, defined according to the business's SOA.

Other exemplary implementation, execution, and monitoring tools (154) in the exemplary system of FIG. 1 include monitors and metrics (160). Monitors are typically used to gather data describing performance of governed processes (120) and SOA governance processes (110). The data describing performance of governed processes and SOA governance processes may be compared to specified metrics in order to determine whether the performance of the governed processes and SOA governance processes is weak or strong. The metrics may also be used to identify particular steps of governed processes (120) and SOA governance processes (110) are ripe for improvement. As such monitors and metrics may be used to increase the efficiency and overall effectiveness of not only the governed processes typically used in implementing, operating, maintaining, and managing an SOA (162), but may also be used to increase the efficiency and overall effectiveness of the SOA governance processes (110) that govern such governed processes (120).

The arrangement of governance processes, governed processes, implementation and execution tools making up the exemplary system illustrated in FIG. 1 are for explanation, not for limitation. Systems useful according to various embodiments of the present invention may include additional computer technology, software applications, servers, routers, devices, architectures, organizational entities, and business members not shown in FIG. 1, as will occur to those of skill in the art. Networks in such systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms.

As mentioned above with respect to FIG. 1, an SOA governance model includes several SOA processes that are governed by several SOA governance processes. These SOA processes, so-called governed processes are used in implementing, operating, maintaining, and managing an SOA for a business. The remaining Figures in this specification describe in detail various embodiments of one exemplary governed process used in governing an SOA in accordance with an SOA governance model. For further explanation, therefore, FIG. 2 sets forth a flow chart illustrating an exemplary method for defining service funding for an SOA according to embodiments of the present invention.

Figure 2:
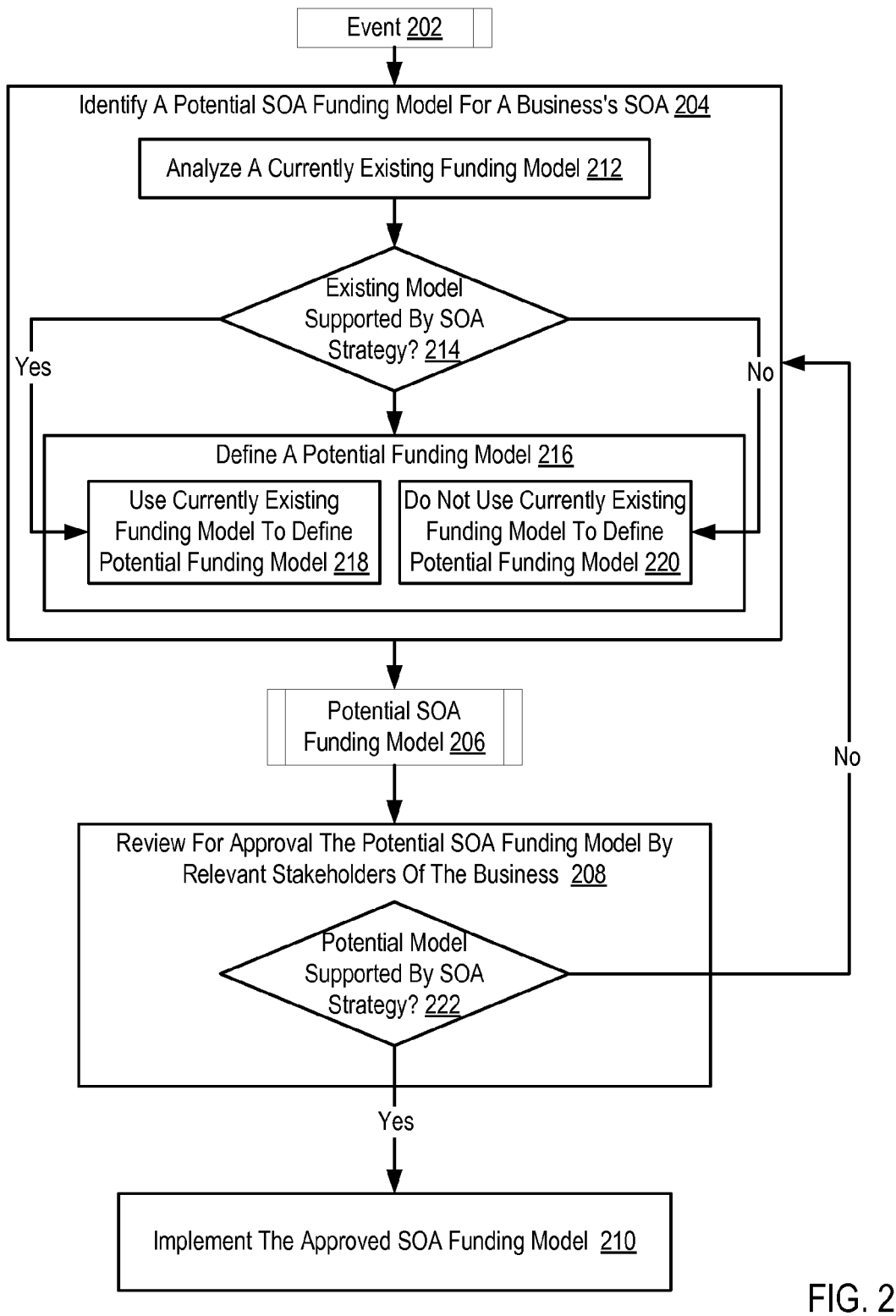
FIG. 2 sets forth a flow chart illustrating an exemplary method for defining service funding for an SOA according to embodiments of the present invention.

The method of FIG. 2 is carried out in response to an event (202) requiring a change in service funding. Service funding refers to the process of allocating and providing assets to services during the services' lifecycle. A service is typically developed, implemented and managed, then terminated. Each phase may require different assets as well as different amounts of assets. Different services also may require different assets and different amounts of the assets. An event (202) requiring a change in service funding is most commonly either a decision by relevant stakeholders in the business to implement an SOA for the first time or a decision by relevant stakeholders in the business to change a currently existing funding model.

In response to such an event (202) requiring a change in service funding, the method of FIG. 2 continues by identifying (204) a potential SOA funding model (206) for a business's SOA. An SOA funding model is a model which is used in governing funding of services implemented in the business's SOA. That is, a funding model generally defines rules for governing the funding of a business's services. One example of a funding model is an incentive model in which one or more business members are rewarded for developing and maintaining a service capable of re-use throughout the business, that is, by several different organizational entities within the business. Another exemplary funding model is a "chargeback" model in which users of a service fund the development, operation, and continued maintenance of a service in an amount proportional to the user's use of the service. The exemplary SOA funding model (206) of FIG. 2 is referred to here as a "potential" SOA funding model in that the specific identified SOA funding model may or may not be implemented after review by relevant stakeholders.

In the method of FIG. 2, identifying (204) a potential SOA funding model includes analyzing (212) a currently existing funding model, determining (214) whether the currently existing funding model is supported by the business's SOA strategy, and defining (216) a potential funding model. In some cases, a business may already employ an SOA funding model at the time the event (202) requiring a change in service funding occurs. In these cases, the method of FIG. 2 dictates that the currently existing model may be used (218) in some way in defining the potential funding model. Alternatively, if the business's currently existing funding model cannot support the business's SOA strategy, the method of FIG. 2 dictates that the currently existing funding model is not used (220) in defining the potential funding model. Identifying (204) a potential SOA funding model according to the method of FIG. 2 may be carried out by one or more business members, one or more governance software applications, web servers, spreadsheets, databases, computers, networks, aggregations of software and hardware, and other tools as will occur to those of skill in the art.

The method of FIG. 2 also includes reviewing (208) for approval the potential SOA funding model (206) by relevant stakeholders of the business and upon approval of the potential SOA funding model by relevant stakeholders of the business, implementing (210) the approved SOA funding model. In some cases the relevant stakeholders may be a group of business members assigned the responsibility of reviewing any potential funding model, a so-called SOA funding model review board for example.

In the method of FIG. 2, reviewing (208) for approval the potential SOA funding model (206) by relevant stakeholders of the business includes determining (222) whether the potential funding model (206) is supported by the business's SOA strategy. If the potential funding model (206) is supported by the business's SOA strategy, the potential funding model is approved by the relevant stakeholders. If, however, the potential funding model (206) is unsupported by the business's SOA strategy, the method of FIG. 2 continues by identifying another potential SOA funding model. Reviewing (208) for approval the potential SOA funding model (206) by relevant stakeholders of the business may be carried out by one or more business members, one or more governance software applications, web servers, spreadsheets, databases, computers, networks, aggregations of software and hardware, and other tools as will occur to those of skill in the art.

Implementing (210) the approved SOA funding model may be carried out first communicating a description of the approved SOA funding model to relevant business members such as service domain owners and those members responsible for funding services and then using the funding model to govern the funding of one or more particular services. These services may be existing services within a business's SOA or new defined services. Such an implementation of the approved SOA funding model may be carried out by one or more business members, one or more governance software applications, web servers, spreadsheets, databases, computers, networks, aggregations of software and hardware, and other tools as will occur to those of skill in the art.

From time to time the method of FIG. 2, that is, the method of defining service funding for an SOA, may be improved. Such improvement is enabled by gathering metrics describing effectiveness of one or more steps of method of defining service funding for an SOA. These metrics may be used by relevant business members to identify areas of the method where improvement may be made. Then the relevant business members may modify, in dependence upon the gathered metrics, the method of defining service funding for an SOA, thereby improving the overall effectiveness of the method.

Readers of skill in the art will recognize that an SOA funding model as described here, when implemented, is used to govern funding of all services, business-wide. That is, the SOA funding model is an overall, general, business-wide funding model by which all individual services are funded. After such an overall, general, business-wide SOA funding model is implemented, secondary events may occur that require a change in funding for an individual service. In such cases, the required change in funding is carried out in accordance with funding rules defined by the implemented overall, general, business-wide SOA funding model. For further explanation, therefore, FIG. 3 sets forth a flow chart illustrating a further exemplary method for defining service funding for an SOA according to embodiments of the present invention that includes such secondary events requiring a change in funding of a particular service.

Figure 3:
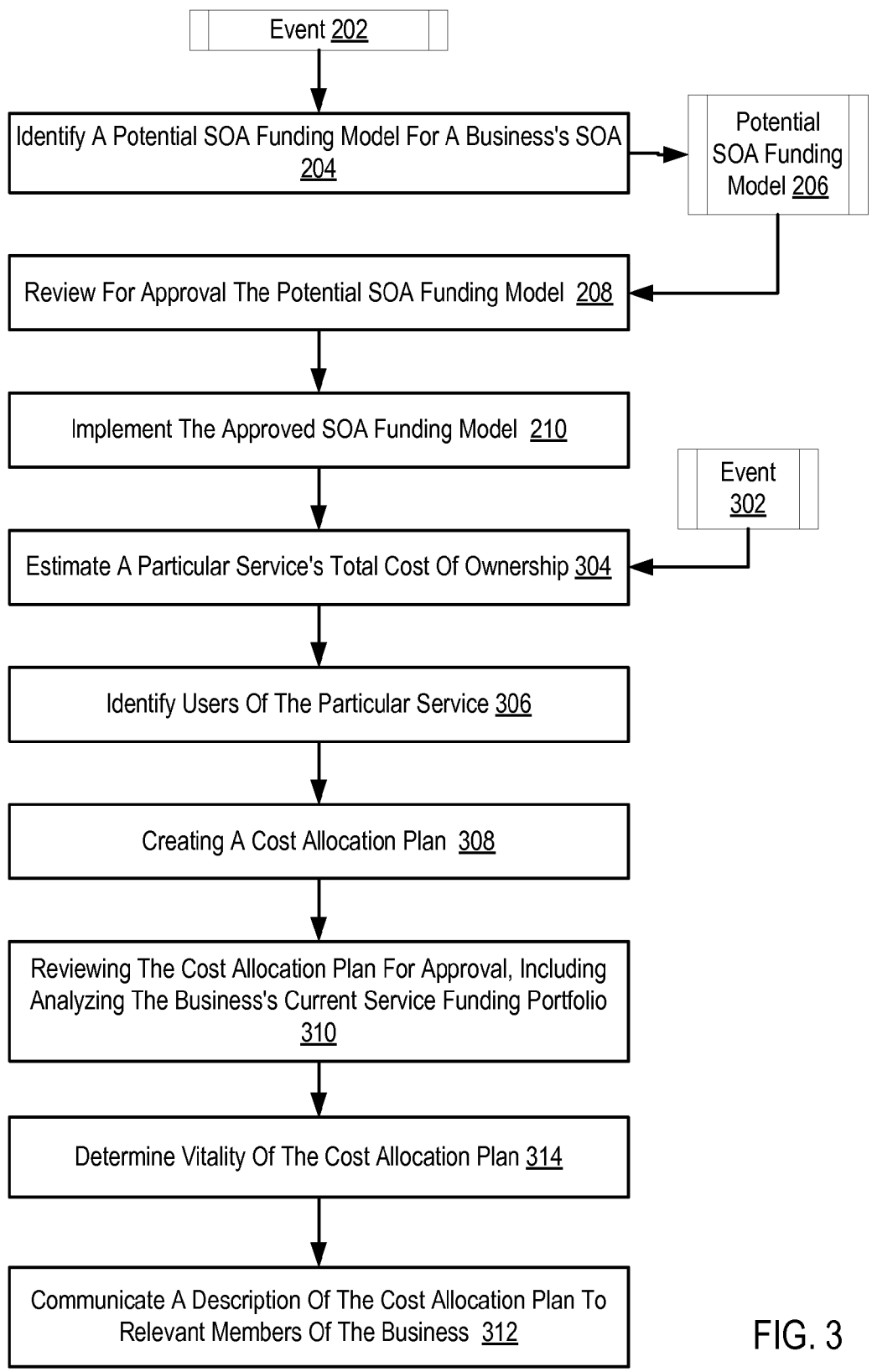
FIG. 3 sets forth a flow chart illustrating a further exemplary method for defining service funding for an SOA according to embodiments of the present invention.

The method of FIG. 3 is similar to the method of FIG. 2 in that the method of FIG. 3, carried out in response to an event (202) requiring a change in service funding, also includes identifying (204) a potential SOA funding model (206) for a business's SOA, reviewing (208) for approval the potential SOA funding model (206) by relevant stakeholders of the business; and upon approval of the potential SOA funding model by relevant stakeholders of the business, implementing (210) the approved SOA funding model.

The method of FIG. 3 differs from the method of FIG. 2, however, in that the method of FIG. 3 also includes, in response to a secondary event (302) requiring a change in a definition of funding for a particular service within the business's SOA: estimating (304) the particular service's total cost of ownership; identifying (306) users of the particular service; creating (308) a cost allocation plan describing allocation of costs of operation of the particular service to one or more potential funding entities of the business in accordance with the approved SOA funding model; and reviewing (310) the cost allocation plan for approval, by a plan review board, including analyzing the business's current service funding portfolio.

Estimating (304) the particular service's total cost of ownership may be carried out by one or more individuals by identifying various cost associated with developing, implementing, operating, managing, and terminating the service. Such costs may include monetary expenses, computer technology necessary for operation of the service, time of business employees in developing and operating the service, and so on as will occur to those of skill in the art. Estimating (304) the particular service's total cost of ownership may be carried out by one or more business members, software applications configured to calculate such total cost of ownership, spreadsheets, databases, computers, networks, aggregations of software and hardware, and other tools as will occur to those of skill in the art.

Identifying (306) users of the particular service may be carried out by identifying individuals or groups of individual most likely to use the type of service offered by the particular service. Such individuals or groups of individuals may be members of the business or customers of the business. Identifying users may be carried out by one or more business members, software applications, spreadsheets, databases, computers, networks, aggregations of software and hardware, and other tools as will occur to those of skill in the art.

Creating (308) a cost allocation plan describing allocation of costs of operation of the particular service to one or more potential funding entities of the business in accordance with the approved SOA funding model may be carried out by identifying one or more potential funding entities, such as service domain owners and service users. Potential funding entities may include existing funding entities currently used in a business. Such an existing entity may include a service domain owner, for example, where each service domain owner of a business is required to fund a service falling within the owner's service domain. A potential funding entity may also be a new entity, that is, an entity newly created for funding the particular service. Creating a cost allocation plan may be carried out through use of organizational software applications, service domain ownership models, spreadsheets, word processors, databases computers, networks, aggregations of software and hardware, and other tools as will occur to those of skill in the art.

In the method of FIG. 3, reviewing (310) the cost allocation plan for approval by a plan review board may be carried out by determining by the review board whether the cost allocation plan is in compliance with predefined SOA policies. Such policies are predefined by one or more members of the business, typically working with a consulting group, and generally include rules that govern SOA process, including, for example, the SOA process of defining service funding. One policy, for example, may define a hurdle rate which a cost allocation plan must meet in order to comply with the policy. A hurdle rate is the minimum rate of return that must be met for a business to undertake a particular project.

In the method of FIG. 3, reviewing (310) the cost allocation plan for approval by a plan review board also includes analyzing the business's current service funding portfolio. A service funding portfolio includes associations of currently existing cost allocations for services and funding entities. That is, the service funding portfolio describes the current overall cost allocations for all services currently existing within a business's SOA. Such a service funding portfolio may be used in reviewing the cost allocation for approval by determining whether the cost allocation plan allocates an excessive amount of cost to one or more funding entities currently funding other existing services.

The method of FIG. 3 also includes determining (314) vitality of the cost allocation plan. Determining (314) vitality of the cost allocation plan may be carried out by determining whether business, information technology, human, and organizational infrastructure exists and is available to the implementation of the cost allocation plan.

The method of FIG. 3 also includes communicating (312), upon approval of the cost allocation plan for the particular service, a description of the cost allocation plan for the particular service to relevant members of the business. Communicating (312) a description of the cost allocation plan for the particular service to relevant members of the business may be carried out by tailoring, for communication in dependence upon classifications of relevant members of the business, the description of the implementation of the defined service domain and the approved potential owner of the defined service domain.

Figure 4:
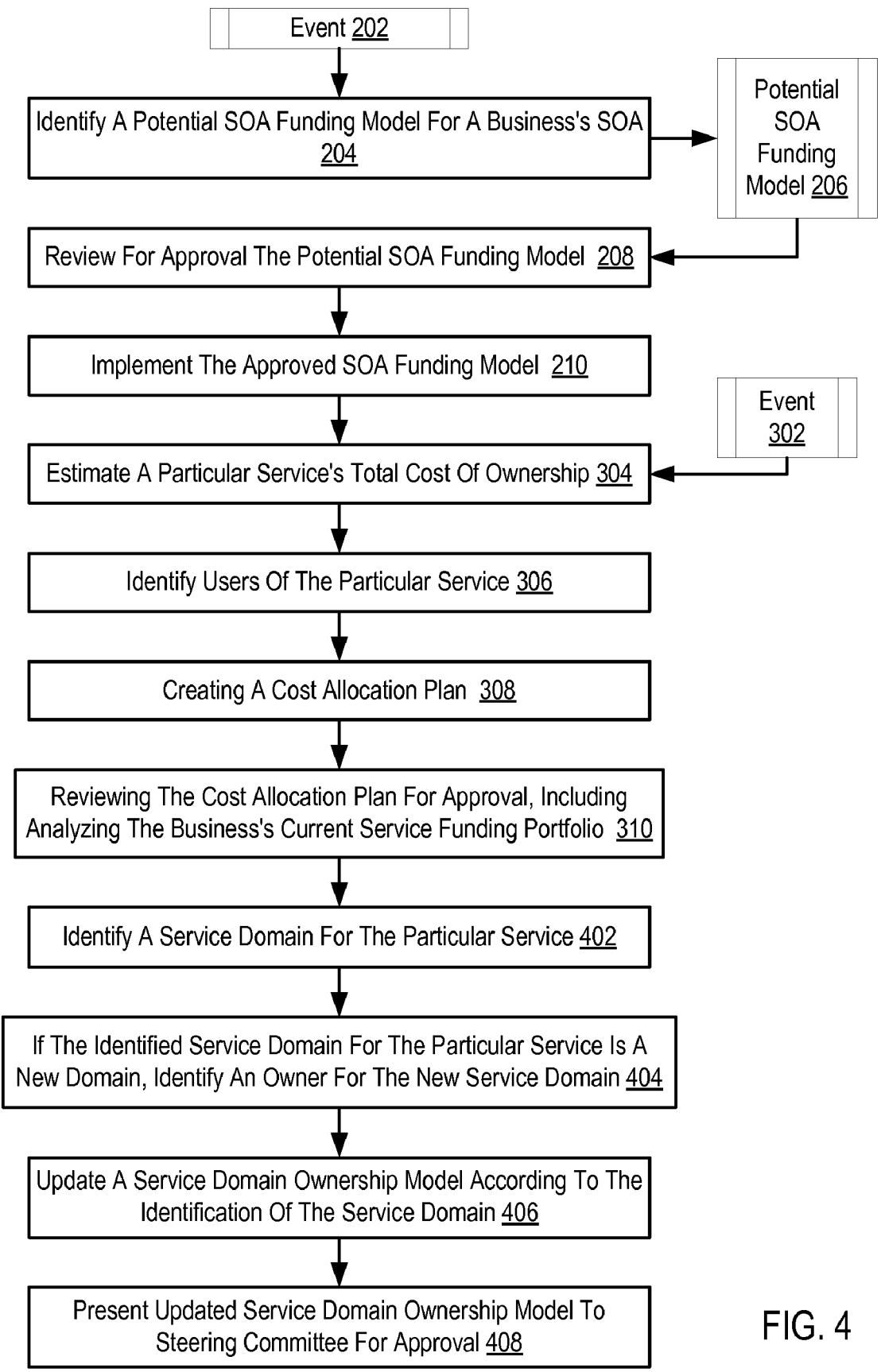
FIG. 4 sets forth a flow chart illustrating a further exemplary method for defining service funding for an SOA according to embodiments of the present invention.

For further explanation FIG. 4 sets forth a flow chart illustrating a further exemplary method for defining service funding for an SOA according to embodiments of the present invention. The method of FIG. 4 is similar to the method of FIG. 3 in that the method of FIG. 4, carried out in response to an event (202) requiring a change in service funding, also includes identifying (204) a potential SOA funding model (206) for a business's SOA, reviewing (208) for approval the potential SOA funding model (206) by relevant stakeholders of the business; upon approval of the potential SOA funding model by relevant stakeholders of the business, implementing (210) the approved SOA funding model.

The method of FIG. 4 is also similar to the method of FIG. 3 in that the method of FIG. 4 also includes, in response to an event (302) requiring a change in a definition of funding for a particular service within the business's SOA: estimating (304) the particular service's total cost of ownership; identifying (306) users of the particular service; creating (308) a cost allocation plan describing allocation of costs of operation of the particular service to one or more potential funding entities of the business in accordance with the approved SOA funding model; and reviewing (310) the cost allocation plan for approval, by a plan review board, including analyzing the business's current service funding portfolio.

The method of FIG. 4 differs from the method of FIG. 3, however, in that in the method, the event (302) requiring a change in a definition of funding for a particular service is a first implementation of the particular service and therefore the method of FIG. 4 illustrates a specific case. As such, the method of FIG. 4 also includes: identifying (402) a service domain for the particular service. Identifying (402) a service domain for the particular service may be carried out by comparing a type of the particular service to a service domain model in order to determine an appropriate domain in which to include particular service. A service domain model is a model that includes associations of service types and service domains. Such identifying of a service domain may be carried out by one or more individuals, software applications configured which service domain models and capable of making comparisons, spreadsheet applications, database applications, and other tools as will occur to those of skill in the art.

If the identified service domain for the particular service is a new domain, the method of FIG. 4 continues by identifying (404) an owner for the new service domain. An identified service domain may be a new domain in that an appropriate domain for a service of the particular service's type does not exist at the time of implementing funding for such service. In such a case, a domain owner must be identified for the new domain. Identifying a new domain owner may be carried out by one or more business members in various ways, such as, identifying as the new domain owner the most likely user of the particular service, or identifying as the domain owner an individual having necessary infrastructure to operate and manage the service, or identifying as the domain owner an individual developing the particular service, and so on as will occur to those of skill in the art.

After identifying a service domain for the particular service the method of FIG. 4 continues by updating (406) a service domain ownership model according to the identification of the service domain. A service domain ownership model includes associations of service domains and owners of service domains. Updating (406) a service domain ownership model according to the identification of the service domain may be carried out by associating within the service domain ownership model the identified service domain with the particular service. Updating (406) a service domain ownership model according to the identification of the service domain may be carried out by through use of one or more individuals, software applications and plug-ins configured for administering service domain ownership models, spreadsheets, word processors, databases computers, networks, aggregations of software and hardware, and other tools as will occur to those of skill in the art.

The method of Figure also includes presenting (408) the updated service domain ownership model to a steering committee for approval. A steering committee is one or more business members assigned the responsibility of determining whether a potential change in service domain ownership may be approved. Presenting (408) the updated service domain ownership model to a steering committee for approval may be carried out by identifying to the steering committee the changes made to the service domain ownership model including the establishment of the new domain. If approved the cost allocation plan, along with the updated service domain ownership model, may be implemented and the details of the implementation may be communicated to relevant business members.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A governed method of defining service funding for a Service Oriented Architecture ('SOA'), the method carried out in response to an event requiring a change in service funding, the method comprising:

identifying, by an aggregation of computer hardware and software, a potential SOA funding model for a business's SOA, the potential SOA funding model governing funding of services implemented in the business's SOA;

reviewing for approval, with an aggregation of computer hardware and software, the potential SOA funding model by relevant stakeholders of the business, wherein reviewing the potential SOA funding model comprises a governance process that governs an SOA process of the business's SOA for defining service funding, the governance process comprising a parameter of a governance model for the business's SOA;

creating a cost allocation plan describing allocation of costs of operation of the particular service to one or more potential funding entities of the business in accordance with the approved SOA funding model; and upon approval of the potential SOA funding model by relevant stakeholders of the business, implementing, with an aggregation of computer hardware and software, the approved SOA funding model.

2. The method of claim 1 wherein identifying a potential SOA funding model for a business's SOA further comprises:
analyzing a currently existing funding model;
determining whether the currently existing funding model is supported by the business's SOA strategy; and
defining a potential funding model.

3. The method of claim 1 wherein reviewing for approval the potential SOA funding model by relevant stakeholders of the business further comprises:
determining whether the potential funding model is supported by the business's SOA strategy.

4. The method of claim 1 further comprising:
in response to an event requiring a change in a definition of funding for a particular service within the business's SOA;
estimating the particular service's total cost of ownership;
identifying users of the particular service;
reviewing the cost allocation plan for approval, by a plan review board, including analyzing the business's current service funding portfolio.

5. The method of claim 4 further comprising:
upon approval of the cost allocation plan for the particular service:
communicating a description of the cost allocation plan for the particular service to relevant members of the business.

6. The method of claim 5 wherein communicating a description of the cost allocation plan for the particular service to relevant members of the business further comprises:
tailoring, for communication in dependence upon classifications of relevant members of the business, the description of the implementation of the defined service domain and the approved potential owner of the defined service domain.

7. The method of claim 4 wherein the event requiring a change in a definition of funding for a particular service comprises a first implementation of the particular service and the method further comprises:
identifying a service domain for the particular service;
if the identified service domain for the particular service is a new domain, identifying an owner for the new service domain; and
updating a service domain ownership model according to the identification of the service domain, the service domain ownership model comprising associations of service domains and owners of service domains.

8. The method of claim 1 further comprising:
gathering metrics describing effectiveness of one or more steps of method of defining service funding for an SOA; and
modifying, in dependence upon the gathered metrics, the method of defining service funding for an SOA.

9. A governance system for defining service funding for a Service Oriented Architecture ('SOA'), the system comprising:
means for identifying, in response to an event requiring a change in service funding, a potential SOA funding model for a business's SOA, the potential SOA funding model governing funding of services implemented in the business's SOA;
means for reviewing for approval the potential SOA funding model by relevant stakeholders of the business, wherein reviewing the potential SOA funding model comprises a governance process that governs an SOA process of the business's SOA for defining service funding, the governance process comprising a parameter of a governance model for the business's SOA;
means for creating a cost allocation plan describing allocation of costs of operation of the particular service to one or more potential funding entities of the business in accordance with the approved SOA funding model; and
means for implementing, upon approval of the potential SOA funding model by relevant stakeholders of the business, the approved SOA funding model.

10. The system of claim 9 wherein means for identifying a potential SOA funding model for a business's SOA further comprises means for:
analyzing a currently existing funding model;
determining whether the currently existing funding model is supported by the business's SOA strategy; and
defining a potential funding model.

11. The system of claim 9 wherein means for reviewing for approval the potential SOA funding model by relevant stakeholders of the business further comprises means for:
determining whether the potential funding model is supported by the business's SOA strategy.

12. The system of claim 9 further comprising:
means for estimating, in response to an event requiring a change in a definition of funding for a particular service within the business's SOA, the particular service's total cost of ownership;
means for identifying users of the particular service; and
means for reviewing the cost allocation plan for approval, by a plan review board, including analyzing the business's current service funding portfolio.

13. The system of claim 12 further comprising:
means for communicating, upon approval of the cost allocation plan for the particular service, a description of the cost allocation plan for the particular service to relevant members of the business.

14. The system of claim 13 wherein means for communicating a description of the cost allocation plan for the particular service to relevant members of the business further comprises means for:
tailoring, for communication in dependence upon classifications of relevant members of the business, the description of the implementation of the defined service domain and the approved potential owner of the defined service domain.

15. The system of claim 12 wherein the event requiring a change in a definition of funding for a particular service comprises a first implementation of the particular service and the system further comprises:
means for identifying a service domain for the particular service;
means for identifying, if the identified service domain for the particular service is a new domain, an owner for the new service domain; and
means for updating a service domain ownership model according to the identification of the service domain, the service domain ownership model comprising associations of service domains and owners of service domains.

16. The system of claim 9 further comprising:
means for gathering metrics describing effectiveness of one or more steps of system of defining service funding for an SOA; and
means for modifying, in dependence upon the gathered metrics, the system of defining service funding for an SOA; and
means for modifying, in dependence upon the gathered metrics, the system of defining service funding for an SOA.

* * * * *